US007654041B2

(12) United States Patent
Costigan et al.

(10) Patent No.: US 7,654,041 B2
(45) Date of Patent: Feb. 2, 2010

(54) WINDOW REGULATOR BRACKET ASSEMBLY

(75) Inventors: Terrence P. Costigan, Fenton, MI (US); David T. Renke, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 33 days.

(21) Appl. No.: 12/022,314

(22) Filed: Jan. 30, 2008

(65) Prior Publication Data

US 2009/0188169 A1 Jul. 30, 2009

(51) Int. Cl.
*B60J 1/16* (2006.01)

(52) U.S. Cl. .......................................... 49/375; 49/374

(58) Field of Classification Search .................. 49/374, 49/375, 348, 349

See application file for complete search history.

(56) References Cited

U.S. PATENT DOCUMENTS 5,657,580 A * 8/1997 Kobrehel ..................... 49/352
6,330,764 B1 * 12/2001 Klosterman .................. 49/375
6,502,352 B1 * 1/2003 Bonduel ........................ 49/26
6,557,302 B1 * 5/2003 Kaps ........................... 49/375
7,021,001 B1 * 4/2006 Schooler ........................ 49/28
7,409,797 B2 * 8/2008 Pound et al. .................. 49/375
7,523,585 B2 * 4/2009 Butera et al. .................... 49/72
2007/0294950 A1 12/2007 Allen et al.

FOREIGN PATENT DOCUMENTS

DE 3627234 A1 * 2/1988
DE 3433784 C2 4/1990

* cited by examiner

*Primary Examiner*—Jerry Redman

(57) ABSTRACT

A window assembly for a vehicle having a body structure with a window enclosure, and a method of installing a window, is disclosed. The window assembly includes a window and a window regulator bracket assembly. The window is slidable into the window enclosure. The window regulator bracket assembly includes a support rod having an upper end mounted to the body structure and a lower end with threads. The window regulator bracket assembly also includes a spring housing slidably received on the lower end of the support rod, a compression spring, a support nut threadably received on the threaded portion in engagement with the spring plate, and a support jaw engaging the bottom edge of the window. The support nut is screwed onto the support rod against the bias of the spring to secure the window in its closed position.

14 Claims, 3 Drawing Sheets

WINDOW REGULATOR BRACKET ASSEMBLY

BACKGROUND OF INVENTION

The present invention relates generally to window supports in vehicles, and more particularly to a window regulator bracket assembly that supports a window.

For some vehicle applications, a particular window enclosure on a vehicle may have an option of being a movable window (raised and lowered by the vehicle operator via a conventional window regulator) or a fixed window. For vehicles with this option, it is cost effective to maintain the window and window enclosure the same for all of the vehicles, whether having a movable or a fixed window.

Accordingly, some mount the window with a manual or power window regulator, whether movable or fixed, so that the installation process, window and window enclosure are essentially the same for both. Then, for the vehicles with a fixed window option, the manual or power regulator, as the case may be, is hand cranked to place the window permanently in the closed position (i.e., no switch or other power window or manual window components are installed to allow for movement of the window after the vehicle leaves the assembly plant). But having a manual or power window regulator supporting a window that will never open is more expensive and heavier than is desired.

Some have tried other alternatives to mount a fixed window in a movable window enclosure. Some employ a stripped-down manual regulator, others bolt a bracket to body structure after the window is in its fully closed position, while others have driven bolts into glass run channels after the window is in its fully closed position. But each of these alternatives has undesirable drawbacks, such as significant alterations to the movable window installation process, high cost, excess weight or all three.

SUMMARY OF INVENTION

An embodiment contemplates a window assembly for a vehicle having a body structure with a window enclosure. The window assembly comprises a window and a window regulator bracket assembly. The window slides into the window enclosure and includes a bottom edge. The window regulator bracket assembly includes a support rod having an upper end selectively mountable to the body structure and a lower end adjacent to a threaded portion, a spring housing slidably received on the lower end of the support rod, a compression spring located in the spring housing, a spring plate mounted in engagement with the compression spring, a support nut threadably received on the threaded portion in engagement with the spring plate, and a support jaw extending upward from the spring housing and operatively engaging the bottom edge of the window.

An embodiment contemplates a vehicle comprising a body structure, a window and a window regulator bracket assembly. The body structure may include a window enclosure and a support slot adjacent to the window enclosure. The window slides in the window enclosure. The window regulator bracket assembly may include a support rod having an upper end with a hook slidably received in the support slot and a lower end adjacent to a threaded portion, a spring housing slidably received on the lower end of the support rod, a compression spring located in the spring housing, a spring plate mounted in engagement with the compression spring, a support nut threadably received on the threaded portion in engagement with the spring plate, and a support jaw extending from the spring housing and operatively engaging the bottom edge of the window.

An embodiment contemplates a method of assembling a window into a window enclosure of a vehicle body structure, the method comprising the steps of: slidably engaging a support rod of a window regulator bracket assembly into a support slot of the vehicle body structure; moving the window regulator bracket assembly away from interference with the window while being slid into the window enclosure; sliding the window into the window enclosure while the window regulator bracket is moved away; moving a support jaw of the window regulator bracket assembly into engagement with a bottom edge of the window; and screwing a support nut onto the support rod against the bias of a compression spring to generate an upward bias force on the support jaw against the bottom edge of the window to thereby secure the window in a closed position in the window enclosure.

An advantage of an embodiment is that the window assembly provides a low cost and weight way to support a fixed window in a window enclosure that is configured to also accept movable windows. This window assembly allows for similar assembly processes for vehicles where the window enclosure accepts fixed or movable windows based on the vehicle option chosen.

DETAILED DESCRIPTION

Figure 1:
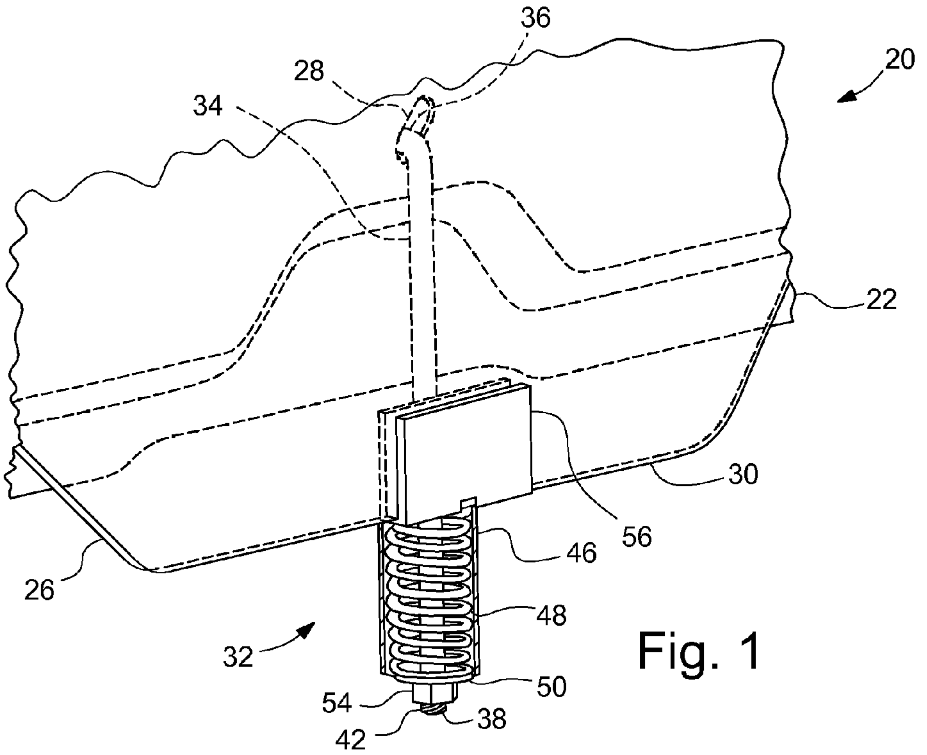
FIG. 1 is a partial cross section, perspective view of a portion of a vehicle having a window regulator bracket assembly supporting a window.
Figure 2:
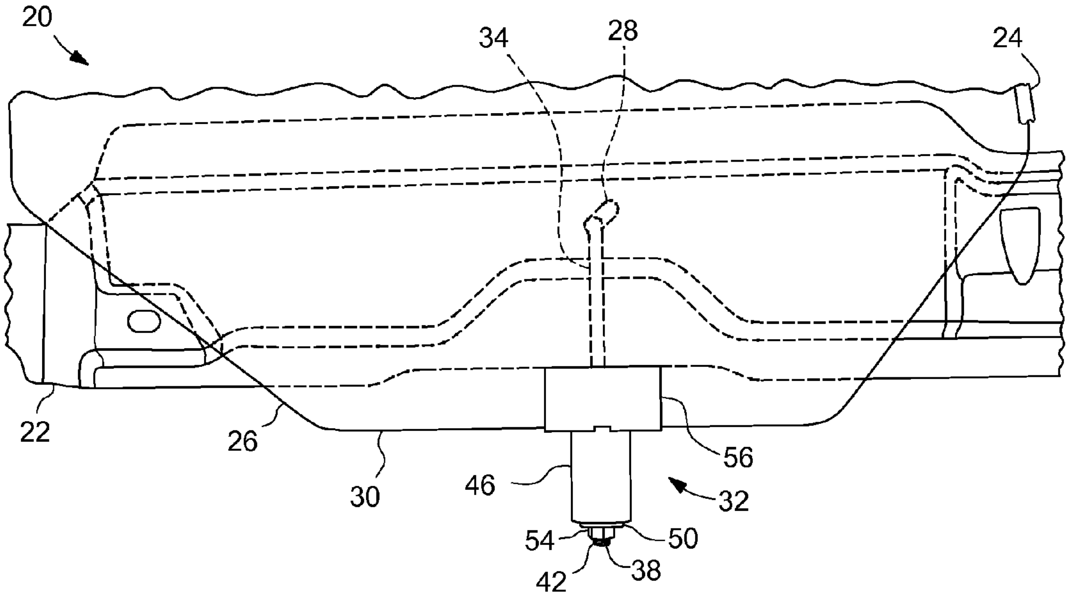
FIG. 2 is a partially schematic, elevation view, on a reduced scale, of the window regulator bracket assembly supporting the window of FIG. 1.
Figure 3:
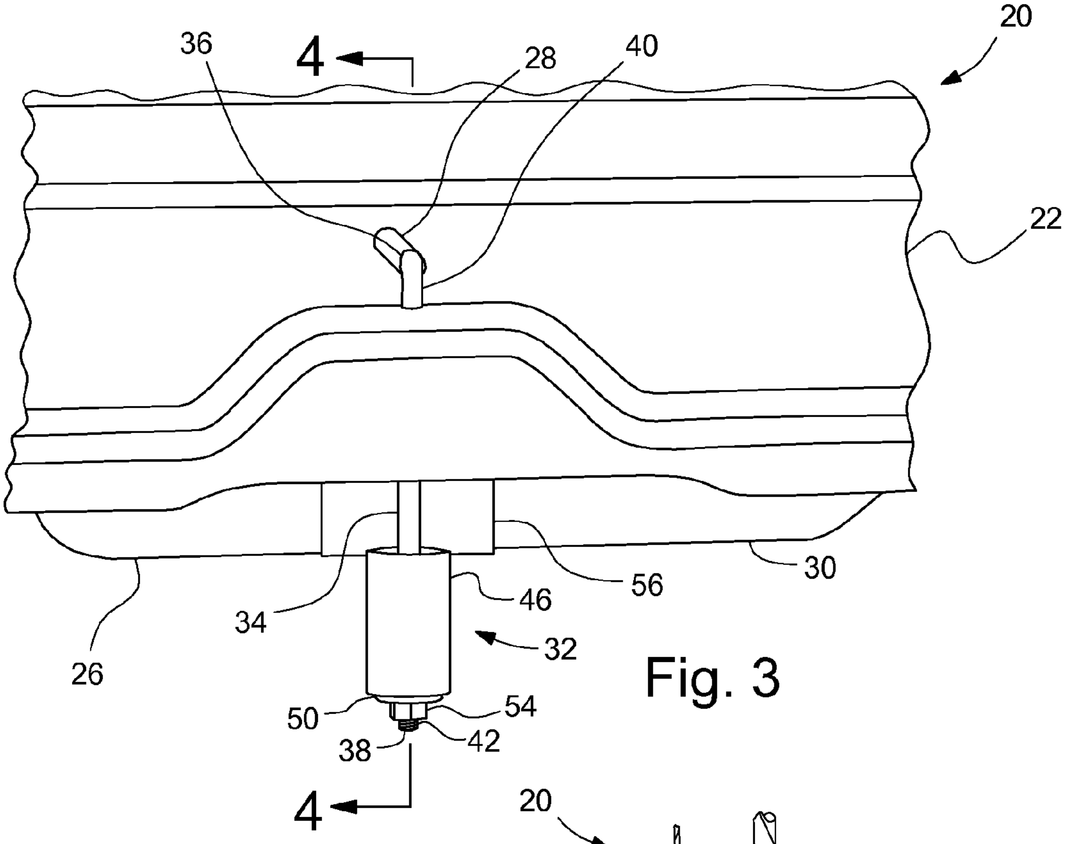
FIG. 3 is a view similar to FIG. 2, but viewing the window regulator bracket assembly supporting the window from the opposite direction.
Figure 4:
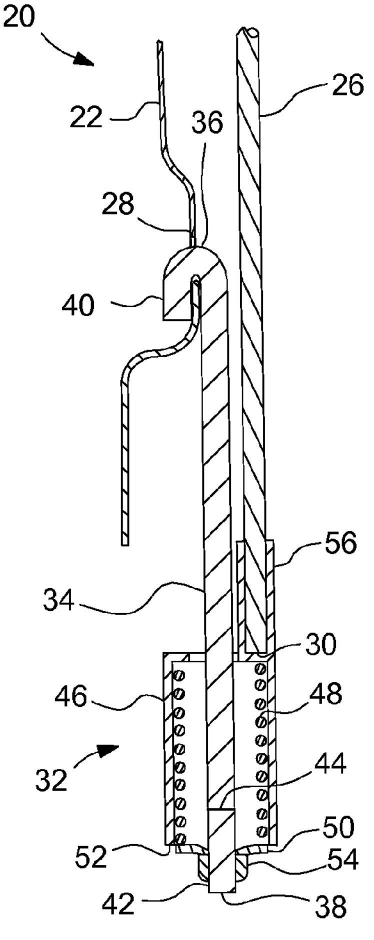
FIG. 4 is a schematic, cross section view, on an enlarged scale, taken along line 4-4 in FIG. 3.

Referring to FIGS. 1-4, a portion of a vehicle, indicated generally at 20, is shown. The vehicle 20 includes body structure 22 and a window enclosure 24 for supporting a window 26. The window 26 slides into the window enclosure 24 so that it can be mounted with a conventional window regulator (not shown) to allow for up and down movement for vehicles with a movable window option. The window 26 in the present embodiment is intended to be installed once and fixed in the closed position at a vehicle assembly plant. The body structure 22 includes a support slot 28, generally centered between the sides of the window and above a bottom edge 30 of the window 26. A window assembly includes the window 26 and a window regulator bracket assembly 32, which supports the window in the window enclosure 24 in the vertical direction.

The window regulator bracket assembly 32 includes a support rod 34 having an upper end 36 and a lower end 38. The upper end 36 includes a hook 40 that slides into and engages the support slot 28 on the body structure 22. A threaded portion 42 extends upward from the lower end 38, up to an end 44 of the threads. The end 44 of the threaded portion 42 acts as a stop, which will be discussed below.

The window regulator bracket assembly 32 also includes a hollow spring housing 46, through which the support rod 34 extends. A compression spring 48 is mounted in the housing 46. A spring plate 50 is mounted on the support rod 34 and extends across a lower opening 52 in the housing 46, engaging the bottom of the compression spring 48. A support nut 54 threads onto the threaded portion 42 against the spring plate 50. The spring plate 50 and support nut 54 may be separate parts or may be one integral part.

A support jaw 56 extends upward from the spring housing 46. The support jaw 56 has a recess with a width sufficient to receive the bottom edge 30 of the window 26, which rests within the support jaw 56. The window regulator bracket assembly 32, thus, will support and maintain the window 26 in the window enclosure 24.

The assembly of the window 26 into the vehicle 20 will now be discussed. The window regulator bracket assembly 32 is assembled with the support nut 54 threaded only a small amount onto the threaded portion 42 of the support rod 34. The hook 40 is inserted into the support slot 28 of the body structure 22, allowing the window regulator bracket assembly 32 to hang below the window enclosure 24. The bracket assembly 32 is pivoted out of the way and the window 26 is slid upward into the window enclosure 24, which will support the window 26 on three sides (top and right/left sides). The support jaw 56 is slid up onto the window 26 from the bottom edge 30. Then, the support nut 54 is screwed onto the support rod 34 until reaching the end 44 of the threaded portion 42. While screwing the support nut 54, of course, the spring plate 50 will slide into the spring housing 46, compressing the compression spring 48 in the spring housing 46. This, in turn, causes the compression spring 48 to bias the spring housing 46 (and hence the support jaw 56) upward. Thus, the support jaw 56 will bias the window 26 upward into its closed position in the window enclosure 24.

The end 44 of the threaded portion 42 is located on the support rod 34 a sufficient distance to reach a desired bias force in the compression spring 48 in order to assure that the window 26 stays snugly closed in the window enclosure 24 for the life of the vehicle 20. Having this arrangement of a compression spring 48, support nut 54 and other components of the window regulator bracket assembly 32 assures that build variation between different vehicles can be accommodated while keeping the assembly 32 light weight and easy to install.

Figure 5:
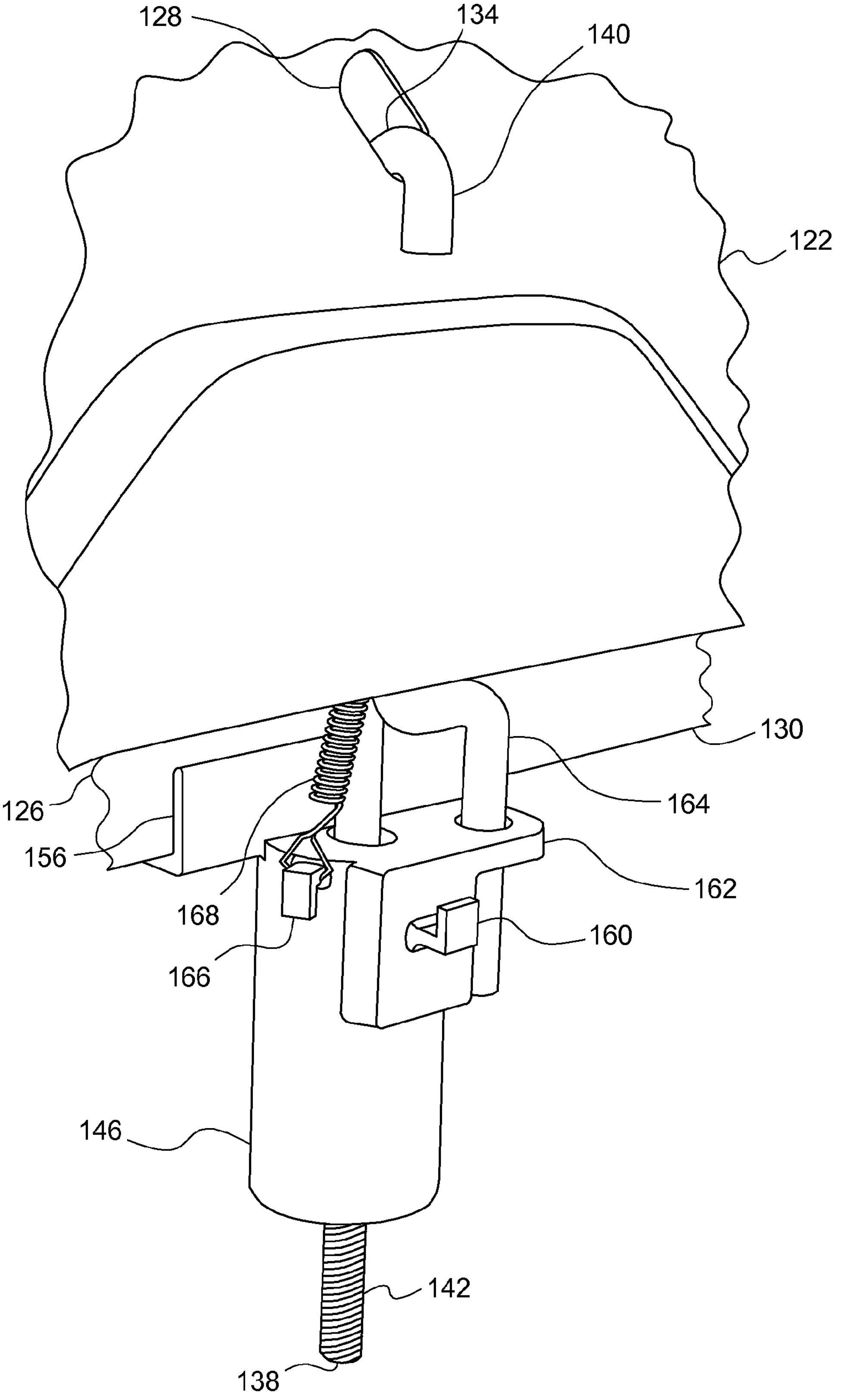
FIG. 5 is a perspective view of a vehicle having a window regulator bracket assembly supporting a window according to a second embodiment.

FIG. 5 illustrates a second embodiment. Since this embodiment is similar to the first, similar element numbers will be used for similar elements, but employing 100-series numbers.

The support rod 134 still includes a hook 140 that engages a support slot 128 in the body structure 122, and a threaded portion 142 at a lower end 138. The support nut, spring plate and compression spring (all three not shown in this embodiment) may be the same as in the first embodiment.

The spring housing 146, however, has several features that differ from the first embodiment. An assembly assist flange 160, which may take the form of a hook, now extends from an outer surface of the spring housing 146. Also, an anti-rotation flange 162 extends from the spring housing 146 and retains an anti-rotation rod 164 in sliding engagement with the spring housing 146. In addition, a spring catch 166 engages one end of an assembly assist spring 168, which is connected at its other end to the support rod 134. A support jaw 156 still engages the bottom edge 130 of the window 126 for supporting the window 126 in its closed position.

The additional features of the second embodiment, while adding a small amount of weight and complexity versus the first embodiment, aid in the installation of the window regulator bracket assembly 132 and window 126. During assembly, after hanging the hook 140 in the support slot 128, one may engage the assembly assist flange 160 in order to pull the window regulator bracket assembly 132 out of the way while the window 126 is being slid into the window enclosure 124. The interaction of the anti-rotation rod 164 with the anti-rotation flange 162 assures that the support jaw 156 stays in the proper orientation relative to the orientation of the window 126. The spring housing 146 is then pulled down (against the bias of the assembly assist spring 168) while the support jaw 156 is centered under the bottom edge 130 of the window 126. The bias of the assembly assist spring 168 will then hold the support jaw 156 against the bottom edge 130 of the window 126. The support nut (not shown in this embodiment) is then screwed onto the threaded portion 142 of the support rod 134 in the same way as in the first embodiment. Thus, the window 126 is securely fixed in its closed position, and the rest of the vehicle assembly may take place.

Another alternative embodiment to the window regulator bracket assembly includes an anti-rotation bend (not shown) in an upper portion of the support rod, with the anti-rotation flange extending adjacent to the anti-rotation bend. Contact between the anti-rotation flange and this bend will limit rotation, thus assuring proper orientation of the support jaw relative to the window. With this alternative, then, the separate anti-rotation rod of the second embodiment is not needed.

For still another alternative embodiment, the assembly assist spring may be mounted inside the spring housing, coaxial with the support rod. A first end engages the spring housing and a second end engages the spring plate or support rod. With this alternative, the internal assembly assist spring is employed rather than the externally located assembly assist spring and spring catch of the second embodiment.

While certain embodiments of the present invention have been described in detail, those familiar with the art to which this invention relates will recognize various alternative designs and embodiments for practicing the invention as defined by the following claims.

What is claimed is:

1. A window assembly for a vehicle having a body structure with a window enclosure, the window assembly comprising:

a window slidable into the window enclosure and including a bottom edge; and a window regulator bracket assembly including a support rod having an upper end selectively mountable to the body structure and a lower end adjacent to a threaded portion, a spring housing slidably received on the lower end of the support rod, a compression spring located in the spring housing, a spring plate mounted in engagement with the compression spring, a support nut threadably received on the threaded portion in engagement with the spring plate, and a support jaw extending upward from the spring housing and operatively engaging the bottom edge of the window.

2. The window assembly of claim 1 wherein the upper end of the support rod includes a hook configured to be slidably received in a support slot of the body structure.

3. The window assembly of claim 1 wherein the threaded portion includes an end located a predetermined distance from the lower end of the support rod thereby limiting the distance the support nut will thread onto the support rod.

4. The window assembly of claim 1 wherein the spring plate and the support nut are integral.

5. The window assembly of claim 1 wherein the spring housing includes an assembly assist flange extending therefrom in opposed relation to the support jaw on the spring housing to thereby assist the window regulator bracket assembly to be moved away from the window as the window is being slidably received in the window enclosure.

6. The window assembly of claim 5 wherein the spring housing includes an anti-rotation flange extending therefrom, and the window regulator bracket assembly includes an anti-rotation feature operatively engaging the anti-rotation flange and configured to thereby limit rotation of the window regulator bracket assembly relative to the window.

7. The window assembly of claim 6 wherein the window regulator bracket assembly includes an assembly assist spring operatively engaging the spring housing and the support rod to thereby bias the spring housing upward toward the bottom edge of the window.

8. The window assembly of claim 1 wherein the spring housing is a hollow cylinder and the compression spring is a helical coil spring.

9. The window assembly of claim 1 wherein the spring housing includes an anti-rotation flange extending therefrom, and the window regulator bracket assembly includes an anti-rotation feature operatively engaging the anti-rotation flange and configured to thereby limit rotation of the window regulator bracket assembly relative to the window.

10. The window assembly of claim 1 wherein the spring housing includes a spring catch extending therefrom, and the window regulator bracket assembly includes an assembly assist spring operatively engaging the spring catch and the support rod to thereby bias the spring housing upward toward the bottom edge of the window.

11. A vehicle comprising:

a body structure including a window enclosure and a support slot adjacent to the window enclosure;

a window slidably received in the window enclosure and including a bottom edge; and a window regulator bracket assembly including a support rod having an upper end with a hook slidably received in the support slot and a lower end adjacent to a threaded portion, a spring housing slidably received on the lower end of the support rod, a compression spring located in the spring housing, a spring plate mounted in engagement with the compression spring, a support nut threadably received on the threaded portion in engagement with the spring plate, and a support jaw extending from the spring housing and operatively engaging the bottom edge of the window.

12. The vehicle of claim 11 wherein the spring housing includes an assembly assist flange extending therefrom in opposed relation to the support jaw on the spring housing to thereby assist the window regulator bracket assembly to be moved away from the window as the window is being slidably received in the window enclosure.

13. The vehicle of claim 11 wherein the spring housing includes an anti-rotation flange extending therefrom, and the window regulator bracket assembly includes an anti-rotation feature operatively engaging the anti-rotation flange to thereby limit rotation of the window regulator bracket assembly relative to the window.

14. The vehicle of claim 11 wherein the window regulator bracket assembly includes an assembly assist spring operatively engaging the spring housing and the support rod to thereby bias the spring housing upward toward the bottom edge of the window.

* * * * *